(12) United States Patent
Thomas et al.

(10) Patent No.: US 9,511,395 B2
(45) Date of Patent: *Dec. 6, 2016

(54) KNUCKLE-JOINTED LANCE SEGMENTS WITH AN EXTERIOR PROTECTIVE SYSTEM

(71) Applicant: Thomas Engineering Solutions & Consulting, LLC, New Iberia, LA (US)

(72) Inventors: William C. Thomas, Lafayette, LA (US); William J. Thomas, III, New Iberia, LA (US)

(73) Assignee: Thomas Engineering Solutions & Consulting, LLC, New Iberia, LA (US)

( * ) Notice: Subject to any disclaimer, the term of this patent is extended or adjusted under 35 U.S.C. 154(b) by 269 days.

This patent is subject to a terminal disclaimer.

(21) Appl. No.: 14/307,245

(22) Filed: Jun. 17, 2014

(65) Prior Publication Data

US 2015/0360265 A1    Dec. 17, 2015

(51) Int. Cl.
*B08B 9/043* (2006.01)
*B08B 9/027* (2006.01)
(Continued)

(52) U.S. Cl.
CPC ............... *B08B 9/043* (2013.01); *B08B 9/027* (2013.01); *F16L 2101/12* (2013.01); *F28G 1/04* (2013.01); *Y10T 403/32877* (2015.01)

(58) Field of Classification Search
CPC ..... B08B 9/043; B08B 9/055; B08B 9/0436; B08B 9/04; B08B 9/027; B08B 9/032; B08B 9/0321; E21B 37/02; F28G 1/04; F28G 1/163; F28G 1/16; Y10T 403/32008; Y10T 403/32016; Y10T 403/32081; Y10T 403/32861; Y10T 403/32877

USPC ............. 15/104.05, 104.09, 104.33, 104.31, 15/104.095, 104.16; 175/325.1, 325.3; 166/241.3, 241.2

See application file for complete search history.

(56) References Cited

U.S. PATENT DOCUMENTS

| | | | | |
|---|---|---|---|---|
| 945,971 | A | * | 1/1910 | Maslin ................... F41A 29/02 15/104.16 |
| 1,608,347 | A | * | 11/1926 | Thompson ............ B08B 9/0553 15/104.061 |

(Continued)

FOREIGN PATENT DOCUMENTS

| CN | 200480012199.4 | 3/2004 |
|---|---|---|
| CN | 202273606 | 6/2012 |

(Continued)

OTHER PUBLICATIONS

International Search Report and the Written Opinion of the International Searching Authority in PCT/US2014/028760 dated Aug. 26, 2014 (11 pages).

(Continued)

*Primary Examiner* — Larry E Waggle, Jr.
*Assistant Examiner* — Andrew A Horton
(74) *Attorney, Agent, or Firm* — Zeman-Mullen & Ford, LLP

(57) ABSTRACT

A knuckle-jointed lance (KJL) segment with an exterior protective system (EPS), comprising an elongated hollow body and at least one protective rod. The body has a generally trapezoidal profile, when viewed in elevation, and is open at both ends. At least one elongate recess is provided in the exterior surface of the body. Each recess follows a predetermined pathway within the exterior surface. At least one consumable protective rod is received into each elongate recess.

19 Claims, 3 Drawing Sheets

(51) Int. Cl.
*F28G 1/04* (2006.01)
*F16L 101/12* (2006.01)

(56) References Cited

U.S. PATENT DOCUMENTS

| | | | |
|---|---|---|---|
| 1,923,328 A * | 8/1933 | Reed | E21B 17/1057 |
| | | | 175/325.3 |
| 2,659,540 A | 11/1953 | Sketchley | |
| 3,492,768 A | 2/1970 | Schuster | |
| 4,178,649 A * | 12/1979 | Kouse | B08B 9/0436 |
| | | | 15/104.061 |
| 4,213,591 A * | 7/1980 | Jaakkola | F16M 11/04 |
| | | | 248/281.11 |
| 4,508,577 A | 4/1985 | Conn et al. | |
| 4,668,117 A | 5/1987 | Bair | |
| 4,771,500 A * | 9/1988 | Kovacs | B08B 9/045 |
| | | | 15/104.33 |
| 4,980,120 A | 12/1990 | Bowman et al. | |
| 5,022,463 A | 6/1991 | Boisture | |
| 5,129,455 A | 7/1992 | Boisture | |
| 5,487,426 A | 1/1996 | O'Hair | |
| 5,564,371 A | 10/1996 | Ashton et al. | |
| 5,584,352 A * | 12/1996 | Beavers | E21B 21/16 |
| | | | 175/317 |
| 6,490,748 B1 * | 12/2002 | O'Neill | B08B 9/045 |
| | | | 15/104.05 |
| 6,543,392 B1 | 4/2003 | Ashton, III et al. | |
| 6,615,848 B2 | 9/2003 | Coats | |
| 6,672,257 B1 | 1/2004 | Ashton, III et al. | |
| RE38,542 E | 7/2004 | Ashton et al. | |
| 7,263,887 B2 | 9/2007 | Sfeir et al. | |
| 7,401,518 B2 | 7/2008 | Sfeir et al. | |
| 7,530,363 B2 | 5/2009 | Garman | |
| 7,552,640 B2 | 6/2009 | Sfeir et al. | |
| 7,997,138 B2 | 8/2011 | Sfeir et al. | |
| 8,398,785 B2 | 3/2013 | Marschall | |
| 8,719,989 B1 * | 5/2014 | Qanaei | B08B 9/055 |
| | | | 15/104.05 |
| 2002/0092647 A1 * | 7/2002 | Terry | E21B 17/1042 |
| | | | 166/241.2 |
| 2002/0104471 A1 | 8/2002 | Awashima et al. | |
| 2006/0249185 A1 | 11/2006 | Garman | |
| 2007/0039570 A1 | 2/2007 | Wilfert | |
| 2007/0154254 A1 * | 7/2007 | Bevirt | F16M 11/40 |
| | | | 403/56 |
| 2010/0326481 A1 | 12/2010 | Buckner | |
| 2011/0016940 A1 | 1/2011 | Poloni et al. | |
| 2011/0017021 A1 | 1/2011 | Minko | |
| 2011/0030734 A1 | 2/2011 | Marschall | |
| 2011/0155174 A1 | 6/2011 | Moll et al. | |
| 2013/0019684 A1 | 1/2013 | Krywyj | |
| 2014/0090665 A1 | 4/2014 | Thomas et al. | |
| 2014/0090674 A1 * | 4/2014 | Thomas | E21B 37/00 |
| | | | 134/166 C |
| 2014/0261547 A1 | 9/2014 | Thomas et al. | |
| 2014/0261580 A1 | 9/2014 | Thomas et al. | |

FOREIGN PATENT DOCUMENTS

| | | |
|---|---|---|
| GB | 2275284 A | 8/1994 |
| WO | 2010/031223 A1 | 3/2010 |
| WO | 2014/144376 A1 | 9/2014 |

OTHER PUBLICATIONS

Technical Industries, Inc., "Vision Array" marketing brochure, publication date unknown.
English version of claims from Chinese Patent No. 200480012199.4.
Decuir, Perry J., "Optimizing Hydraulic Presses Using Data Acquisition Systems", proposed IFPE Paper, actual publication date unknown but prior to Feb. 1, 2012.
Combined Search and Examination Report Under Sections 17 and 18(3) issued by the Intellectual Property Office of the United Kingdom dated Jul. 31, 2015 (7 pages).

* cited by examiner

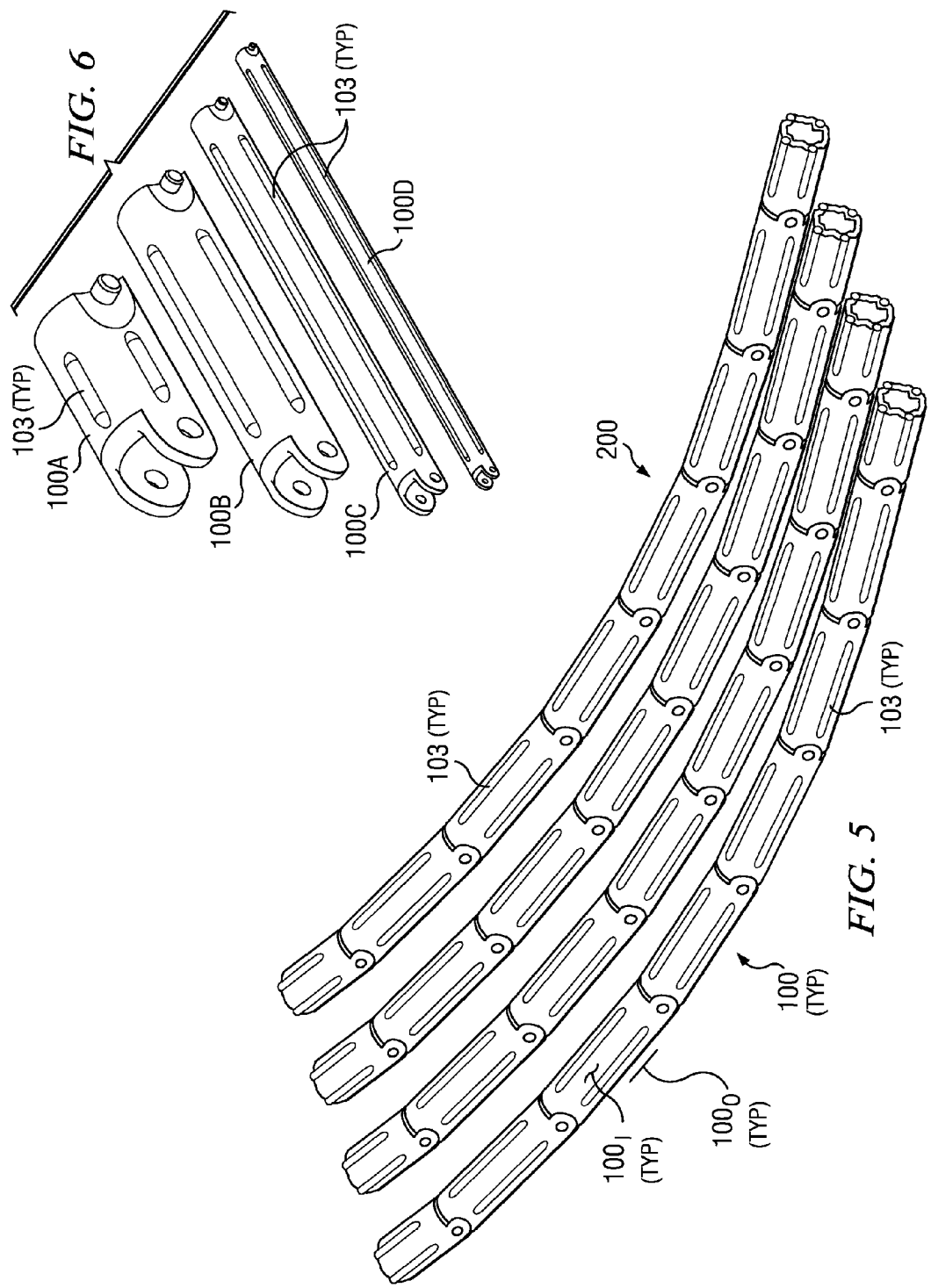

KNUCKLE-JOINTED LANCE SEGMENTS WITH AN EXTERIOR PROTECTIVE SYSTEM

RELATED APPLICATIONS

Reference is hereby made to the following commonly assigned and co-pending U.S. non-provisional patent applications, both filed on Mar. 15, 2013: Ser. No. 13/833,108 (KNUCKLE-JOINTED LANCE FOR INTERNAL CLEANING AND INSPECTION OF TUBULARS) and Ser. No. 13/832,340 (METHODS FOR INTERNAL CLEANING AND INSPECTION OF TUBULARS) (collectively, "Prior Applications"). The disclosures of the Prior Applications are incorporated into the present application by reference.

FIELD OF THE INVENTION

This disclosure is directed generally to technology useful in tubular cleaning operations in the oil and gas exploration field, and more specifically to protecting segmented lances used for cleaning and inspecting the internals of tubulars such as drill pipe, workstring tubulars, and production tubulars.

BACKGROUND OF THE INVENTION

Throughout this disclosure, the term "Scorpion" or "Scorpion System" refers generally to the Thomas Services Scorpion brand proprietary tubular management system as a whole. Aspects of the Scorpion system are disclosed in the Prior Applications. In particular, aspects of a knuckle-jointed lance ("KJL") are disclosed and claimed in nonprovisional patent application Ser. No. 13/833,108.

In conventional tubular cleaning operations, the cleaning apparatus is typically stationary, while the tubular is drawn longitudinally past the cleaning apparatus. The tubular is rotated at a relatively slow speed (in the range of 50 rpm, typically) while stationary, spring-loaded air motors drive spinning wire brushes and cutter heads on the inside diameter of the tubular as it is drawn past, via skewed drive rolls. These air brushes are colloquially called "cutters" although they perform abrasive cleaning operations on the internal surface of the tubular.

Internal tubular cleaning operations typically also include hydroblasting in the prior art, although this is conventionally understood to be supplemental to the wire brush cleaning described above, rather than a primary cleaning process in and of itself. Typically this conventional hydroblasting is a low pressure water or steam pressure wash at pressures ranging from about 2,500 psi to 3,500 psi.

As disclosed in the Prior Applications, embodiments of the Scorpion System operate by rotating the tubular to be cleaned ("Work") while keeping the Work stationary with respect to the cleaning apparatus. The Scorpion then moves the cleaning apparatus up and down the length of the Work while the Work rotates, typically at speeds in a range of about 400-500 rpm, and potentially up to 1,750 rpm under certain criteria. The Scorpion System may draw the cleaning apparatus up and down the length of the Work at speeds within a range of about 0.5 to 5.0 linear feet per second ("fps"), depending on the selected corresponding rotational speed for the Work.

More specifically, the Scorpion System provides a series of extendable and retractable lances ("knuckle-jointed lance" or "KJL") that move up and down the internal surface of the Work as it rotates. The structure and operation of the extendable and retractable lances are described at length and in full in the Prior Applications. In summary, the KJL is a concatenated string of articulated segments that are generally trapezoidal. Each KJL provides tool hardware to perform a desired function, including, for example and without limitation, hydroblasting, steam cleaning, washing and rinsing, high and low volume compressed air blowing, gas drying, or any combination of enabled functions. To perform these functions, the Scorpion System enables an individual KJL, one at a time, to be extended from a "reel"-like structure into and out of the Work in a user-selected sequence. The Scorpion System moves the user-selected KJL, according to the sequence, into and out of position for extension and retraction into and out of the Work while the Work rotates.

The Scorpion System has several significant advantages over conventional tubular cleaning systems, as described in the Prior Applications, and the KJL described in the Prior Applications has been found to be serviceable to provide those advantages. However, especially in high rotational speed applications, prolonged contact between KJL segments and the interior of the Work may potentially lead to high wear on the KJL segments or the Work itself. It would thus be advantageous to enhance the KJL with a protective system configured to minimize wear.

SUMMARY AND TECHNICAL ADVANTAGES

The KJL segment with an exterior protective system ("EPS") described in this disclosure addresses the above-described potential enhancement to the Scorpion System. Generally, this disclosure describes a hollow KJL segment with one or more elongate recesses in its exterior surface that receive and securely hold protective rods protruding above the outermost exterior surface of the KJL segment. The rods are advantageously a consumable component, secured in the recesses by conventional methods (e.g., via press-fit, threaded fastener, or an adhesive) that permit them to be removed and replaced. The addition of the replaceable protective rods around the exterior of the KJL segments may minimize the wear on the KJL segments and on the interior of the Work. In this way, the EPS may extend the life of the KJL segments and may prevent damage to the interior of the Work.

In one aspect, the KJL segment with an exterior protective system comprises an elongated hollow body and at least one protective rod. The body is open at both of first and second ends and has a generally trapezoidal profile when viewed in elevation from a perspective generally perpendicular to the longitudinal axis of the body. The trapezoidal profile is formed by a top side and a base side separated by first and second leg sides. The base side is longer than the top side, and the first and second leg sides correspond to the first and second ends of the body, respectively. The exterior surface of the body includes at least one elongate recess that follows a predetermined pathway in the exterior surface of the body. Examples of enabling predetermined pathways include: (a) a pathway extending parallel to the longitudinal axis and extending at least partially between first and second ends of the body; (b) a circumferential pathway at least partially around the body; and (c) a helical pathway. The illustrated embodiments in this disclosure are exemplary. Other embodiments of the KJL segment within the scope of this disclosure may include, for example, different quantities or lengths of elongate recesses on each KJL segment, or recesses having different profile geometries.

At least one protective rod is received into each elongate recess so that each rod, when operationally received, protrudes above the outermost exterior surface of the KJL segment. The body also includes at least one lug pin on either the first or second end of the body and at least one lug hole on the other end. The lug pin and lug hole are positioned so that when a plurality of bodies are concatenated together to form a string, each lug pin on a first body is configured to mate with a corresponding lug hole on an adjacent second body. In this way, the rods as deployed on the KJL segments form at least a partially continuous series of protective members along the length of a concatenated string of KJL segments.

Particular embodiments of the KJL segment may provide a plurality of recesses and may include rods that are tapered and one end, both ends, or neither end. The rods may be made from materials such as metal, plastic, a composite, titanium, stainless steel or self-lubricating oil-impregnated bronze. One specific example of a suitable material for the rods is ultra-high-molecular-weight (UHMW) polyethylene (available from Acme Plastics of Woodland Park, N.J. at: http://acmeplastics.thomasnet.com/viewitems/olefin/uhmw-rods). As noted, the rods are advantageously a consumable part and thus may be secured in the recesses by conventional process that enable the rods to be removed and replaced, such as press-fit, threaded fastener, or by using an adhesive. In other embodiments, the rods provide a dovetail-shaped portion in cross-section, configured to mate with a corresponding dovetail cross-sectional shape of a receiving recess. The recess may be open at one end, allowing the dovetail-shaped portion of a rod to slide into, and thus be retained by, the corresponding dovetail shape in the recess. Once received fully received into the recess, and secured in the recess, the rod may be immobilized by, for example, a threaded fastener. In yet other embodiments, the recess is open at one end of the KJL segment and extends under the surface of the KLJ segment at the other end. In this embodiment, the rods slide into the recess from the open end and are retained by the cavity at one end and threaded fastener at the open end. It will be appreciated that the insertion method will be selected by the user based upon the operating environment. In some applications, it may be beneficial to use a method that permits the rods to rotate freely within the elongate recesses, such as press-fit. In other situations, a method that rigidly fixes the rods into the recess (e.g., threaded fasteners or adhesives) may be advantageous.

The embodiment of the KLJ segment depicted on FIGS. 1, 1A, and 2 provides four elongate recesses in the exterior surface of the body, spaced equally about the surface. The rods in the illustrated embodiment are tapered at both ends and substantially coextensive with the length of the elongate recesses in which they are secured. It should be noted that the illustrated embodiments in this disclosure are not intended to be a limitation on the scope of this disclosure with regard to the composition, geometry, method of securing, or quantity of rods secured in each recess. In other embodiments, for example, rods may have non-circular cross-sectional profiles (e.g., "pear-shaped" or triangular). Further, rods are not limited to cylindrical geometries and could be spherical, or could have extended radial lengths (appearing more like "fins".

In another aspect, the KJL segments, including the protective rods, are concatenated into a string with a tool head connected at one end. The string comprises a plurality of articulated joints in which each articulated joint connects a second end of a first KJL segment to a first end of an adjacent second KJL segment. Because the rods protrude above the outermost exterior surface of the KJL segment they form an effective outer diameter of the KJL once the KJL segments are concatenated. Thus, when the KJL is extended into the rotating Work, the outer diameter formed by the rods contacts the interior of the Work rather than the KJL segment to which the rods are attached. Contact with the rods rather than the KJL segments helps protect both the interior surface of the Work and the KJL segment. itself.

The KJL with an exterior protective system (EPS), as described in this disclosure, offers several technical advantages that enhance the KJL described in the Prior Applications. The EPS may extend the life of the KJL itself by reducing the likelihood of contact between the KJL segments and the interior of the Work and thus, lowers the cost of ownership of Scorpion System. Additionally, because the material used to make the rods is typically softer than the Work, the EPS will also help prevent damage to the interior of the Work.

In other embodiments (not illustrated in this disclosure), the EPS may further comprise bearings to assist with prevention of damage to the interior of the Work. The bearings may be in addition to, or instead of protective rods or fins as described and illustrated. The bearings are advantageously provided in or on the surface of the KJL segments, and may be of any suitable design, such as, for example, roller bearings or ball bearings. The bearings may further be oriented in any suitable pattern on the KJL segments. Examples of bearing patterns include lines of bearings disposed on the KJL segment surface: (1) spaced apart and parallel to the longitudinal axis of the KJL segment, or (2) in arcuate configurations and radial to the longitudinal axis of the KJL segment, or (3) in a helical formation. Bearings may be provided in grooves on the surface of the KJL segment, or in races attached to the surface of the KJL segment. This disclosure is not limited in any regard to user-selected bearing configurations that may be suitable for particular applications.

Reducing the likelihood of damage to the Work provides at least two advantages. First, it permits the user to take the benefits of the Scorpion System (e.g., small footprint and improved speed and quality of cleaning operation) without an increased risk of damaging the Work. Second, the Scorpion System, as described in the Prior Applications, may be used in conjunction with a data-acquisition system to inspect the interior of the Work (e.g., by thermal imaging, acoustic analysis or magnetic flux/resistivity analysis). Inspection and examination data acquired during Scorpion System operations may be advantageous, for example, to coordinate with earlier data regarding the particular piece of Work to provide a history on the Work, or to coordinate with comparable data obtained by the Scorpion System regarding the exterior surface of the Work to provide a yet more detailed and high resolution analysis of the state of the Work. Thus, the EPS, by reducing the likelihood that the KJL could damage the interior of the Work, makes the KJL more compatible with the data-acquisition benefits the Scorpion System provides.

The foregoing has outlined rather broadly some of the features and technical advantages of the EPS in order that the detailed description that follows may be better understood. Additional features and advantages of the EPS will be described hereinafter which form the subject matter of the claims set forth in this application. It should be appreciated by those skilled in the art that the conception and the specific embodiments disclosed may be readily utilized as a basis for modifying or designing other structures for carrying out the same inventive purposes of the EPS. It should be also be realized by those skilled in the art that such equivalent constructions do not depart from the spirit and scope of the EPS as set forth in the appended claims.

BRIEF DESCRIPTION OF THE DRAWINGS

For a more complete understanding of the EPS, and the advantages thereof, reference is now made to the following descriptions taken in conjunction with the accompanying drawings, in which:

FIGS. 3, 4, and 5 illustrate aspects and features of presently preferred embodiments of KJL assembly 200;

FIG. 6 illustrates examples of other potential embodiments of KJL segment 100.

DETAILED DESCRIPTION

Reference is now made to FIGS. 1 through 6 in describing the currently preferred embodiments of KJL segment 100 and KJL assembly 200. Any part, item, or, feature that is identified by part number on one of FIGS. 1 through 6 has the same part number when illustrated on another of those figures. It will be understood that the embodiments as illustrated and described with respect to FIGS. 1 through 6 are exemplary, and the scope of the inventive material set forth in this disclosure is not limited to such illustrated and described embodiments.

Figure 1:
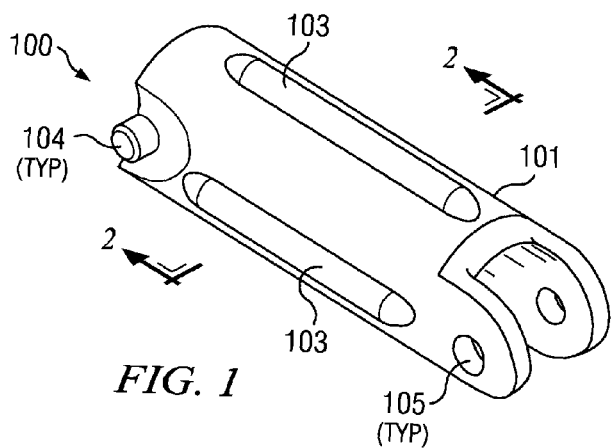
FIG. 1 is an isometric view of one embodiment of a KJL segment with an exterior protective system 100.
Figure 1A:
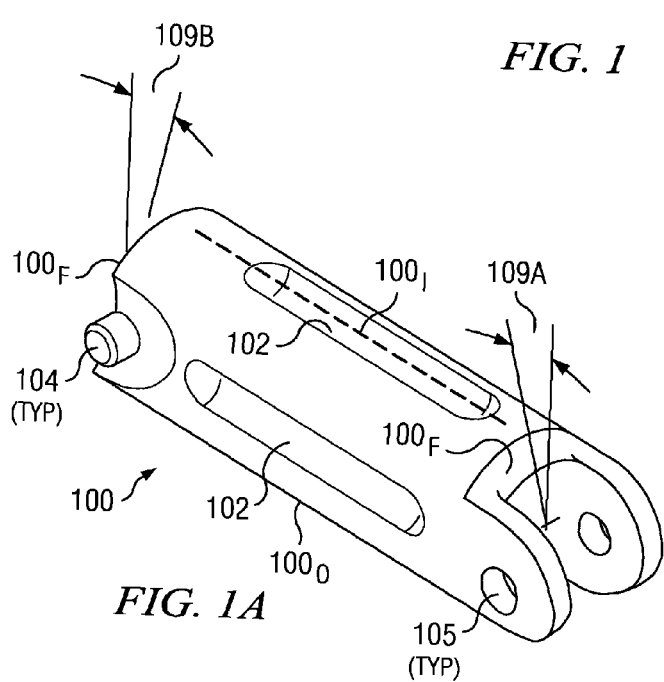
FIG. 1A shows KJL segment 100 from FIG. 1 without protective rod 103.
Figure 2:
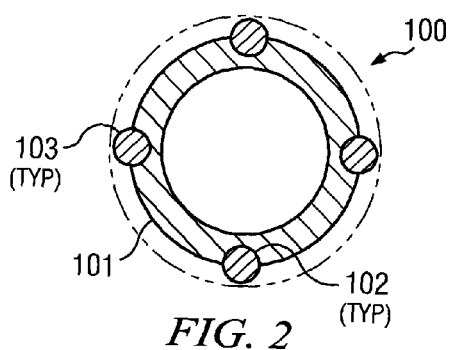
FIG. 2 is a cross-section as shown on FIG. 1.

FIGS. 1, 1A, and 2 illustrate one embodiment of KJL segment 100 with an exterior protective system 100 deployed thereon. As shown on FIG. 1, KJL segment 100 comprises an elongated hollow body 101 and a protective rod 103. As shown on FIG. 2, each rod 103 is received into recess 102 (recess 102 is not visible on FIG. 1). On FIG. 1A, rod 103 is omitted to show recess 102 in the exterior surface of body 101. As depicted, recess 102 is parallel to the longitudinal axis of body 101 and extends at least part way from one end of body 101 to the other. However, the geometry and orientation depicted of the rods recesses 102 (and corresponding rods 103) will be understood to be merely exemplary and that this disclosure is not limited in regard to such geometry and orientation. In other embodiments of KJL segment 100 (not illustrated), recesses 102 may have alternative cross sections (e.g. "pear-shaped", dovetailed or triangular) or orientations (e.g., circumferential or helical).

In current embodiments, body 101 is open at both ends and has a generally trapezoidal shape when viewed in elevation. The trapezoidal shape of KJL segment 100 is depicted on FIG. 1A, which illustrates opposing faces $100_F$ (shown, but hidden at one end of KJL segment 100) and longitudinal outer surfaces $100_I$ and $100_O$. Opposing faces $100_F$ are configured to slope towards one another. This sloping is illustrated on FIG. 1A at items 109A and 109B, where the planes of faces $100_F$ are illustrated to have angular deviation from a theoretical face plane that would be normal to the longitudinal axis of the KJL segment 100. In this way, the length of KJL segment 100 is less along longitudinal surface $100_I$ than it is along longitudinal surface $100_O$. Thus, when viewed in elevation from a perspective generally perpendicular to the longitudinal axis, as shown on FIGS. 3 and 4, KJL segment 100 has a generally trapezoidal shape where the top and base of the trapezoid are formed by longitudinal outer surfaces $100_I$ and $100_O$ and the sides of the trapezoid are formed by opposing faces $100_F$.

FIG. 2 depicts KJL segment 100 in cross section, as shown on FIG. 1. As illustrated by the chain-dotted line on FIG. 2, it will be appreciated that rods 103 protrude above the outermost exterior surface of body 101 so that they protect KJL segment 100 and the tubular being cleaned (i.e. the Work, not shown on FIG. 2) from damage during cleaning operations. In general, rods 103 are dimensionally adapted to be received into recesses 102 as shown on FIGS. 1 and 2. As depicted on FIG. 1, presently preferred embodiments of rod 103 are substantially equal in length to the recess 102 in which they are secured and are generally cylindrical with a taper at both ends. Other embodiments of rod 103 (not depicted) may be spherical, or if cylindrical, have other cross-sectional profiles (e.g., "pear-shaped", dovetailed or triangular) and may be tapered at either end, at both ends, or not tapered. However, this disclosure is not limited in this regard.

As further illustrated on FIGS. 1 and 1A, KJL segment 100 also includes pins 104 at one end (one pin is hidden from view) and lug holes 105 at the other end. By linking the pins 104 of one KJL segment 100 into the lug holes 105 of another, a plurality of KJL segments 100 may be concatenated into a KJL assembly 200, as illustrated on FIGS. 3, 4, and 5. In other embodiments of KJL segment 100 (not illustrated), trunnion holes may be substituted for pins 104. The plurality of KJL segments 100 may then be concatenated into a KJL assembly 200 by securing a trunnion pin through the trunnion hole of one KJL segment 100 and the corresponding lug hole 105 of a neighboring KJL segment 100.

When KJL assembly 200 is formed by linking pins 104 and lug holes 105 (or by using trunnion pins and holes), longitudinal surfaces $100_I$ and $100_O$ line up, and the shorter lengths of surfaces $100_I$ permit a "rolling up" of KJL assembly 200. As shown on FIG. 5, in the "rolled up" orientation of KJL assembly 200, surfaces $100_I$ form the innermost surface of curvature, and surfaces $100_O$ form the outermost surfaces of curvature. Therefore, as described in the Prior Applications, KJL assembly 200 may be rolled and unrolled, as required, onto or off of one or more rotary "reel"-like assemblies as it is retracted or extended into and out of the tubular being cleaned.

Figure 3:
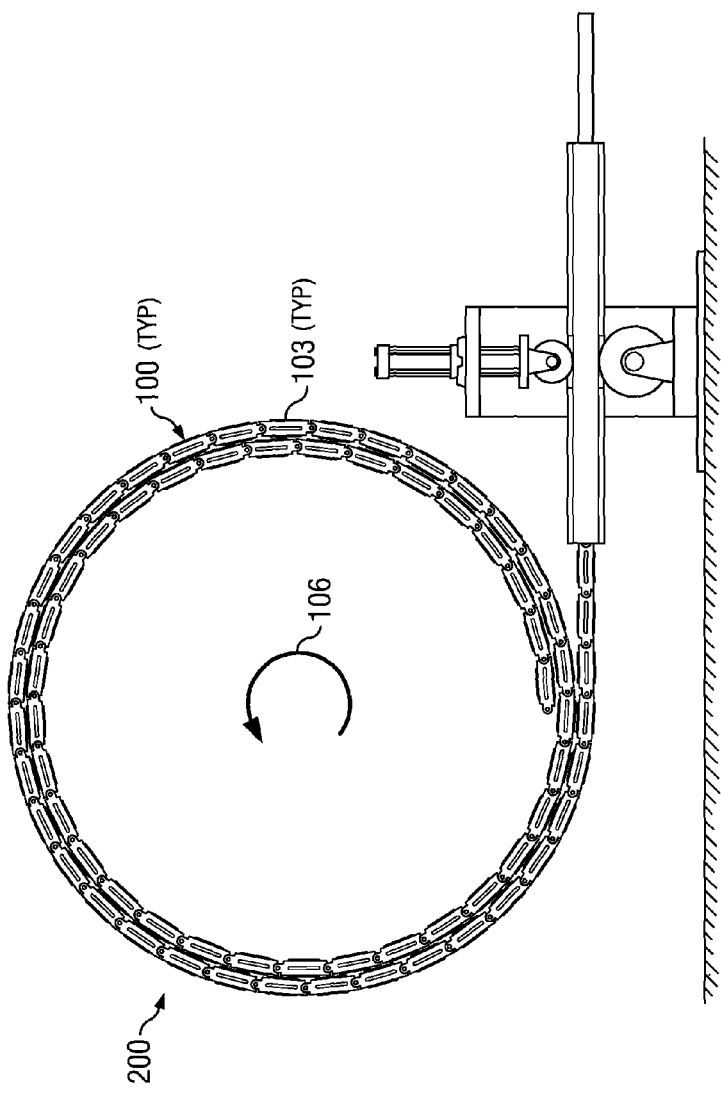

FIG. 3 illustrates KJL assembly 200 in a "rolled up" configuration. It can be seen from FIG. 3 that by following directional arrow 106, the articulated and generally trapezoidal nature of concatenated KJL segment 100 enables KJL assembly 200 to be "unrolled" into a horizontal and flat configuration, as shown on FIG. 4. This "unrolled" configuration enables KJL assembly 200 to be retracted or extended into and out of the tubular being cleaned. KJL assembly 200 is "rolled up" in the direction of directional arrow 106R (on FIG. 4), to wind it back onto the "reel"-like assembly.

Figure 4:
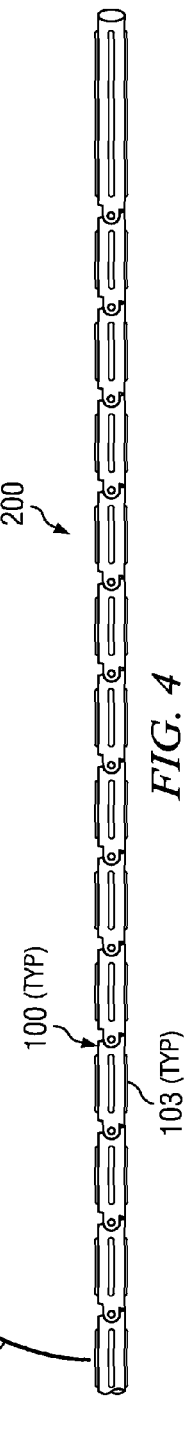

To avoid doubt, note that FIGS. 1, 1A, and 2 illustrate a currently preferred design of an individual KJL segment 100, which is just one example of a KJL segment 100. Many types of individual designs of KJL segments 100 are available within the scope of this disclosure. Some examples of other geometries are illustrated on FIG. 6, which shows KJL segments 100A through 100D with various lengths and diameters. Likewise, FIGS. 3, 4, and 5 illustrate a currently preferred design of a KJL assembly 200. The size (diameter), number and length of individual KJL segments 100 in a particular KJL assembly 200 may vary per user design according to curvature and other geometric parameters necessary for a particular deployment of KJL assembly 200. The benefits and limitations of such alternative lengths and geometries of KJL segments 100 in a particular KJL assembly 200 (as selected per user design) are discussed in the Prior Applications. Nothing in this disclosure should be interpreted to limit a KJL assembly 200 to any particular deployment or to any particular length, size (diameter), number, or uniformity of KJL segments 100.

The KJL segment with an EPS, as described in this disclosure, enhances the performance of the Scorpion System and allows the user to obtain the significant benefits of the Scorpion System without increasing the risk of damage to tubulars, drill pipe, or the KJL itself. While the KJL disclosed in the Prior Applications is serviceable, and an improvement over conventional cleaning systems, KJL segments 100 and corresponding KJL assemblies 200 disclosed herein constitute an enhancement by extending the service life of KJL segment 100 and protecting the items being cleaned. For example, one operational goal of the Scorpion System is to substantially reduce conventional cleaning time. To achieve this goal, the tubulars to be cleaned are rotated at a higher speed than in conventional cleaning systems. Consequently, there may be an increased risk of damage to the tubular or the KJL. The disclosed KJL segment 100 and KJL assembly 200 may reduce this risk without sacrificing the overall advantages of the Scorpion System.

Although the EPS and its advantages have been described in detail, it should be understood that various changes, substitutions and alternations can be made herein without departing from the spirit and scope of the EPS as defined by the appended claims.

We claim:

1. A knuckle-jointed lance segment with an exterior protective system, comprising:
    an elongated hollow body with a longitudinal axis and first and second ends, the body having an exterior surface, the body further having a generally trapezoidal profile when viewed in elevation from a perspective generally perpendicular to the longitudinal axis;
    the trapezoidal profile having a top side and a base side separated by first and second leg sides, the base side longer than the top side, the first and second leg sides corresponding to the first and second ends of the body respectively;
    the body open at both of first and second ends;
    at least one elongate recess provided in the exterior surface, each elongate recess following a predetermined pathway within the exterior surface;
    at least one protective rod received into each elongate recess such that each rod, when operationally received into its elongate recess, protrudes from the exterior surface while being securely retained in the recess, and;
    at least one lug pin on one of the first and second ends of the body, at least one lug hole on the other of the first and second ends of the body;
    wherein, when a plurality of bodies are concatenated together to form a string, each lug pin on a first neighboring body is configured to mate with a corresponding lug hole on a second neighboring body.

2. The knuckle-jointed lance segment of claim 1, in which the body includes four elongate recesses provided in the exterior surface, each elongate recess extending parallel to the longitudinal axis and extending at least partially between the first and second ends of the body, the four elongate recesses spaced equally about the exterior surface of the body.

3. The knuckle-jointed lance segment of claim 1, in which the predetermined pathway of at least one elongate recess is selected from the group consisting of:
    (a) a pathway extending parallel to the longitudinal axis and extending at least partially between the first and second ends of the body;
    (b) a circumferential pathway at least partially around the body; and
    (c) a helical pathway.

4. The knuckle-jointed lance segment of claim 1, in which at least one protective rod is received into its corresponding elongate recess via a technique selected from the group consisting of: (a) press fit; (b) threaded fastener; (c) mating dovetail profiles; and (d) an adhesive.

5. The knuckle-jointed lance segment of claim 1, in which at least one elongate recess has an open end opposite a closed end, and in which a corresponding protective rod is received by sliding into the open end, and then fastening at the open end.

6. The knuckle-jointed lance segment of claim 1, in which at least one protective rod rotates within its corresponding elongate recess.

7. The knuckle-jointed lance segment of claim 1, in which at least one protective rod has first and second rod ends, and in which at least one of the first and second rod ends is tapered.

8. The knuckle-jointed lance segment of claim 1, in which at least one protective rod is made from a material selected from the group consisting of:
    (a) plastic;
    (b) metal;
    (c) composite;
    (d) titanium;
    (e) stainless steel; and
    (f) self-lubricating oil-impregnated bronze.

9. The knuckle-jointed lance segment of claim 1, in which at least one protective rod has a cross-section selected from the group consisting of: (a) dovetailed in at least a portion thereof; (b) pear-shaped; (c) triangular, and (d) circular.

10. The knuckle-jointed lance segment of claim 1, in which the exterior surface of the body further comprises bearings.

11. A knuckle-jointed lance assembly, comprising:
    a plurality of knuckle-jointed lance segments as recited in claim 1, the plurality concatenated into a string thereof;
    the string further comprising a plurality of articulated joints, each articulated joint connecting a second end of a first knuckle-jointed lance segment to a first end of an adjacent second knuckle-jointed lance segment.

12. The knuckle-jointed lance assembly of claim 11, in which a tool head is connected to a distal end of the knuckle-jointed lance assembly.

13. A knuckle-jointed lance segment with an exterior protective system, comprising:
    an elongated hollow body with a longitudinal axis and first and second ends, the body having an exterior surface, the body further having a generally trapezoidal profile when viewed in elevation from a perspective generally perpendicular to the longitudinal axis;
    the trapezoidal profile having a top side and a base side separated by first and second leg sides, the base side longer than the top side, the first and second leg sides corresponding to the first and second ends of the body respectively;
    the body open at both of first and second ends;
    four elongate recesses provided in the exterior surface of the body, the four elongate recesses spaced equally about the exterior surface, each elongate recess extending parallel to the longitudinal axis and extending at least partially between the first and second ends;

at least one protective rod received into each elongate recess such that each rod, when operationally received into its elongate recess, protrudes from the exterior surface while being securely retained in the recess, and;

at least one lug pin on one of the first and second ends of the body, at least one lug hole on the other of the first and second ends of the body;

wherein, when a plurality of bodies are concatenated together to form a string, each lug pin on a first neighboring body is configured to mate with a corresponding lug hole on a second neighboring body.

14. The knuckle-jointed lance segment of claim 13, in which at least one protective rod is received into its corresponding elongate recess via a technique selected from the group consisting of: (a) press fit; (b) threaded fastener; (c) mating dovetail profiles; and (d) an adhesive.

15. The knuckle-jointed lance segment of claim 13, in which at least one elongate recess has an open end opposite a closed end, and in which a corresponding protective rod is received by sliding into the open end, and then fastening at the open end.

16. The knuckle-jointed lance segment of claim 13, in which at least one protective rod has first and second rod ends, and in which at least one of the first and second rod ends is tapered.

17. The knuckle-jointed lance segment of claim 13, in which at least one protective rod is made from a material selected from the group consisting of:
 (a) plastic;
 (b) metal;
 (c) composite;
 (d) titanium;
 (e) stainless steel; and
 (f) self-lubricating oil-impregnated bronze.

18. The knuckle-jointed lance segment of claim 13, in which at least one protective rod has a cross-section selected from the group consisting of: (a) dovetailed in at least a portion thereof; (b) pear-shaped; (c) triangular, and (d) circular.

19. The knuckle-jointed lance segment of claim 13, in which the exterior surface of the body further comprises bearings.

* * * * *